United States Patent [19]
Hembling et al.

[11] Patent Number: 5,997,937
[45] Date of Patent: Dec. 7, 1999

[54] QUICK-SETTING GEL MIX

[75] Inventors: Mark V. Hembling, New Fairfield, Conn.; Steven J. Leusner, Orono, Minn.; Joseph E. Spradlin, Hot Springs, Ark.

[73] Assignee: Kraft Foods, Inc., Northfield, Ill.

[21] Appl. No.: 09/022,110

[22] Filed: Feb. 11, 1998

Related U.S. Application Data

[63] Continuation-in-part of application No. 08/976,102, Nov. 21, 1997, which is a continuation of application No. 08/643,697, May 6, 1996, abandoned.

[51] Int. Cl.$^6$ .................................................. A23L 1/0532
[52] U.S. Cl. ........................... 426/575; 426/541; 426/573
[58] Field of Search ..................... 426/573–577, 426/541

[56] References Cited

U.S. PATENT DOCUMENTS

| | | | |
|---|---|---|---|
| 2,000,807 | 5/1935 | Wig | 426/575 |
| 2,559,338 | 7/1951 | Barch | 426/577 |
| 2,673,157 | 3/1954 | Shepherd et al. | 426/577 |
| 2,701,767 | 2/1955 | Twieg et al. | 426/576 |
| 2,809,894 | 10/1957 | Poarch et al. | 426/576 |
| 2,930,701 | 3/1960 | Merton et al. | 426/575 |
| 2,935,409 | 5/1960 | McDowell et al. | 426/575 |
| 3,455,701 | 7/1969 | Miller et al. | 426/575 |
| 3,850,838 | 11/1974 | Guckenberger et al. | 426/575 |
| 3,899,598 | 8/1975 | Fischer et al. | 426/73 |
| 4,012,533 | 3/1977 | Jonas | 426/565 |
| 4,268,533 | 5/1981 | Williams et al. | 426/577 |
| 4,310,681 | 1/1982 | Klemarczyk et al. | 426/534 |
| 4,338,350 | 7/1982 | Chen et al. | 426/577 |
| 4,362,757 | 12/1982 | Chen et al. | 426/599 |
| 4,666,754 | 5/1987 | Arioka et al. | 428/141 |
| 4,693,728 | 9/1987 | Clare et al. | 426/573 |
| 5,373,016 | 12/1994 | Brown et al. | 514/372 |
| 5,389,393 | 2/1995 | Hembling et al. | 426/541 |

OTHER PUBLICATIONS

Food Hydrocolloids, vol. II, by Martin Glicksman pp. 165–166 [CRC Press, Inc. 1983].

Food Sciences, vol. 4, Part 1, Owen Fennema pp. 360–364, (Marcel Dekker, Inc. New York, NY 1976).

*Primary Examiner*—Lien Tran
*Attorney, Agent, or Firm*—Thomas R. Savoie; Thomas A. Marcoux

[57] ABSTRACT

A quick-setting gel mix suitable for preparing dessert gels with improved clarity contains sodium and/or potassium alginate, a slowly-soluble calcium salt, an anti-oxidant, such as ascorbic acid, and a catalyst, such as copper gluconate and/or ferric sulfate, in amounts effective to promote clarity within the gel.

8 Claims, No Drawings

QUICK-SETTING GEL MIX

This application is a continuation-in part of copending application Ser. No. 08/976,102 filed Nov. 21, 1997, which is a continuation of now abandoned application Ser. No. 08/643,697 filed May 6, 1996.

FIELD OF THE INVENTION

This invention relates to a powdered, gel-forming composition and more particularly to a one-package, gel-forming, dry-mix composition which rapidly forms a gel having good texture and clarity.

DESCRIPTION OF PRIOR ART

Gelatin dessert gels are well-known and highly regarded by consumers. However, as crystalline gelatin is not soluble in cold water, recipes for making gelatin gels call for dissolution of the gelatin in boiling water. The gelatin solution must then be cooled to below about 70° F. (21.1 ° C.) in order to effect gelation. Typically about a two-hour period is necessary in order to produce gelatin desserts. There has long been a desire to provide a gelled dessert in quick-gel form. Such a product would not have to be prepared hours in advance of consumption, but could be made ready for consumption within minutes. The prior art has disclosed consumption within minutes. The prior art has disclosed methods for producing cold-water soluble gelatin; however, the length of time needed to set the gel is still in the one to two hour range.

U.S. Pat. No. 5,389,393 to Hembling et al. describes an alginatebased dry mix for preparing quick-setting gels. This patent, which is hereby incorporated by reference, produced a desirable, instant gel utilizing an agglomerated calcium salt as a component.

SUMMARY OF THE INVENTION

The present invention describes a dry mix for producing quick-set alginate gels having improved texture as compared to the aforementioned Hembling et al. patent. The dry mix of this invention includes sodium or potassium alginate in readily dispersible form, sweetener and/or bulling agent, acid, buffer, flavor, color and a slowly-soluble calcium salt. The mix also includes an anti-oxidant in an amount to increase the clarity of the gel and a cupric and/or ferric compound to catalyze the reaction of the anti-oxidant with dissolved oxygen.

The sweetener may include sugars, and/or intensive sweeteners such as aspartame, asulfame-K, sucralose, saccharine, dihydrochalcone, cyclamate and the like.

As used herein all percentages are by weight unless specifically stated otherwise. Particle size distributions are recited in terms of weight distributions on U.S. Standard Sieves.

DETAILED DESCRIPTION OF THE PREFERRED EMBODIMENT

Sodium or potassium alginate is ground and sieved as needed to obtain a fraction which is 100% minus 200 U.S. mesh, preferably 100% minus 230 U.S. mesh. Typically the average mean particle sizes diameter of the alginate particles is from 10

The powdered alginate component of the mix needs to be readily dispersible in water. Desirably the alginate powder is tacked into the surface of a granular component of the gel mix, This is typically sucrose; however, in the case of a reduced sugar or sugar-free version of the gel mix, the granular component could be a water-soluble bulking agent, such as maltodextrin, polydextrose, sorbitol, etc. The granular component, or a fraction thereof, is coated with a surface-active agent such as polyhydric alcohol (e.g., glycerin and propylene glycol), mono- and diglycerides, polysorbates and the like. The surface active agent will typically be used at a level which is from 5 to 25% by weight of the alginate powder. The surface active agent will usually be blended with or sprayed onto the surface of a granular, major components. A suitable particle size for the granular component would be at least four times larger than the alginate powder. An average mean particle size diameter of from 135–245 microns is preferred.

Alternatively, the alginate powder can be made dispersible by means of agglomeration. Agglomeration may be effected using an aqueous agglomerating fluid which may be water or water with a minor (e.g., up to 20%, preferably up to 10%) amount of an agglomerating aid, such as triacetin, glycerin, or other dispersing aid. Agglomeration of the alginate powder may be effected utilizing standard equipment and methodology such as by batch or continuous fluid bed agglomeration or continuous co-current or counter-current tower agglomeration. The alginate agglomerates are sieved to scalp off over-sized clusters, which would be slow to dissolve, to obtain a fraction with 100% being minus 16 U.S. mesh, preferably 100% minus 20 U.S. mesh and with no more than 50% passing through a 170 U.S. mesh sieve, preferably with no more than 50% passing through a 140 U.S. mesh sieve. The alginate powder may be co-agglomerated with another of the gel mix ingredients, such as sugar and/or dextrin.

The slowly-soluble calcium salt (e.g., calcium citrate, carbonate, phosphate, sulfate and/or tartrate) is according to this invention, incorporated into a crystalline sugar matrix. This technique has been found to be a highly desirable mechanism to slow down dissolution of the calcium salt so that most of the alginate is dispersed and dissolved prior to a significant build-up of calcium ion concentration. In the case of calcium sulfate, and other crystalline calcium salts, crystals of the salt are incorporated in the crystalline sugar product.

Incorporation of the calcium salt into the crystalline sucrose matrix may be accomplished in accordance with the teachings of U.S. Pat. No. 4,338,350 to Chen et al. which is hereby incorporated by reference. According to this patent the crystallized sucrose products are comprised of aggregates or agglomerates of fondant-size sucrose crystals, e.g., in the range of about 3–50 microns, intimately associated with calcium salt particles. The agglomerates form a loose, lacy network bonded together at their interfaces by point contact. Accordingly, aqueous liquid can rapidly penetrate the porous cluster of agglomerates and free each of the particles making up the agglomerates. This patent teaches that the particles making up the agglomerate become readily dispersed and/or dissolved in water. It has been found, however, that, for use in formulating a quick-set alginate gel, the rate of dissolution in cold water is sufficiently slow that the co-crystalized calcium salt-sucrose ingredient is preferred to the agglomerated calcium salt ingredient of the U.S. Pat. No. 5,389,393.

The crystalline sugar product used in the present invention is prepared by concentrating a sugar syrup at a temperature in the range of about 250° F. to about 300° F. to a solids content of about 90 to 98% by weight, said sugar syrup containing no more than about 20% by weight non-sucrose solids; admixing the concentrated sugar syrup with the slowly-soluble calcium salt; subjecting the mixture to vigorous mechanical agitation, such as impact beating, within a crystallization zone until a crystallized sugar product made up of aggregates of fondant-size sucrose crystals and the calcium salt is formed, the crystallized sugar product having a moisture content of less than 2.5% by weight; and recovering the crystallized sugar product from the crystallization zone. If desired, the resulting crystallized sugar product may be dried to a moisture content of less than 1% by weight. The product will be homogeneous, dry, granular, free-flowing and non-caking.

The calcium salt added to the sugar syrup should be a finely ground material. A particle size distribution where essentially all of the material passes through a 230 U.S. mesh sieve is suitable. Preferably at least 95% of the material will pass through a 325 U.S. mesh sieve.

The crystalline sugar product is preferably screened through a 20 U.S. mesh sieve, preferably through a 40 U.S. mesh sieve, for use in the quick-setting gel mix of invention. While the crystalline product may contain from 1 to 50% or more calcium salt, a calcium salt level of 15 to 50% will be typical. If the crystalline product is to be used in a "sugar-free" mix (i.e., less than 0.5 g sugar per serving), calcium salt levels of at least 20% will usually be required.

To protect against the effects of hard water which is present in many households and which may contain up to and in excess of 400 p.p.m. total hardness (i.e., a combination of dissolved calcium and magnesium), the dessert gel mix of this invention will usually contain a buffering agent, such as trisodium citrate, which includes a monovalent cation. Other. suitable buffers would be sodium and potassium phosphates, acetates, tartrates, malates, fumarates, adipates and ascorbates and potassium citrate.

The gel mix of the present invention may also contain sweetening agents, bulking agents, food acids, flavors and colors. Preferably a anti-oxidant, such as ascorbic acid, erythorbic acid or tocopherols, such as vitamin E, is also included to increase the rate at which the prepared dessert gel absorbs dissolved oxygen and clarifies.

To further speed clarification of the gel it has been found desirable to also include a cupric and/or ferric compound in the dry mix in an amount sufficient to catalyze the reaction between the anti-oxidant and dissolved oxygen present in the gel. A preferred cupric compound is copper gluconate. A preferred ferric compound is ferric sulfate. A combination of copper gluconate and ferric sulfate may be most preferred. Typically these catalysts will be present in the mix at a level which is from 0.5 to 10%, preferably 1 to 5%, by weight of the anti-oxidant.

An alternative approach to remove dissolved oxygen from the gel is by means of an enzyme system, such as glucose oxidase - catalase. This specific system will effectively combine dissolved oxygen with glucose, thereby reducing the number and size of air bubbles in the final gel. The mechanism for the glucose oxidase-catalyse system is believed to include glucose oxidase catalyzing the oxidation of glucose to gluconic acid and hydrogen peroxide followed by the catalysis of hydrogen peroxide by catalyze to form water and a half mole of oxygen. In this manner oxygen is gradually consumed. A small amount of glucose could be added to the gel mix to provide a source of glucose. Alternatively, invertase could be included in the enzyme system to convert a portion of sugar to glucose and fructose.

The acid component is employed to give the desirable sour taste and pH of conventional fruit-flavored dessert gels. Acids such as citric, adipic, fumaric, malic and/or tartaric may be employed. The amount of acid employed is sufficient to give a final pH in the prepared dessert gel of between 3.5 and 5.5, preferably between about 4.0 and 4.5.

The dry dessert mixes of this invention are able to produce a dessert gel within 20 minutes or less. Formulas which can produce gels within as little as five minutes are possible. Preparation is a simple matter of combining the dry mix with water. Cold tap water is preferred as ice-cold water will retard dissolution of the calcium salt resulting in gels of improved texture. However, the water temperature can range from 32° to 80° F. (0° to 26.7° C.). A spoon, fork or wire whisk can be used to dissolve the mix in water. An electric mixer is not needed. Stirring for less than two minutes, typically about one minute, will suffice to achieve complete dissolution. The alginate gel will set within 20 minutes either in or out of a refrigerator. Usually, however, the ungelled mixture is placed in a refrigerator to set so that it will be chilled prior to being served. The resulting gel has a texture which is as desirable as gelatin gels.

This invention is further described but not limited by the following Example.

EXAMPLE

| Ingredient | Parts by Weight |
| --- | --- |
| Sucrose (granular) | 88.1 |
| Potassium Alginate (powdered) | 3.2 |
| Adipic Acid | 3.2 |
| Trisodium Citrate | 2.2 |
| Cocrystallized Calcium Sulfate (20% calcium sulfate/about 80% sucrose) | 1.7 |
| Flavor/Color | 0.7 |
| Ascorbic Acid | 0.4 |
| Glycerin | 0.3 |
| Copper Gluconate | 0.01 |

A sugar-sweetened dessert gel mix was prepared by adding the granular sugar to a mixer followed by slow addition of the glycerin and mixing for five minutes. The powdered alginate was than added and mixed for five minutes. The remainder of the ingredients were added and mixed for 10 minutes.

Twenty-four grams of the mix was combined with 118 ml of cold water and stirred with a spoon for one minute. The mixture began to thicken within one minute and was placed in a refrigerator to cool. After 20 minutes the gel was judged to have a smooth texture with good clarity and dessert gel characteristics.

Although this invention has been described primarily with reference to a sugar-sweetened gel mix, it will be apparent, as taught by the Hembling et al patent, that reduced sugar and sugar free gel mixes may be formulated.

Having thus described the invention what is claimed is:

1. A readily dispersible, dry mix for producing a quick-setting, aqueous gel having a pH of between 3.5 and 5.5 comprising: sweetener, potassium and/or sodium alginate, acid, buffering agent, a slowly-soluble calcium salt, an anti-oxidant from the group consisting of ascorbic acid, erythorbic acid, tocopherol and combinations thereof in an amount that will react with dissolved oxygen present in the gel and cooper gluconate and/or ferric sulfate in an amount from 0.5 to 10% by weight of said antioxidant and sufficient to catalyze the reaction of the antioxidant with said dissolved oxygen.

2. The dry mix of claim 1, wherein the calcium salt is calcium sulfate, citrate, carbonate, phosphate and/or tartarate.

3. The dry mix of claim 2, wherein the calcium salt is calcium sulfate.

4. The dry mix of claim 1, wherein the sweetener is comprised of sucrose and at least a portion of the sucrose is coated with a surface-active agent.

5. The dry mix of claim 4, wherein the surface-active agent is selected from the group consisting of polyhydric alcohols, mono- and diglycerides, polysorbates and combinations thereof.

6. The dry mix of claim 4, wherein particles of powdered potassium and/or sodium alginate are adhered to the coated sucrose.

7. The dry mix of claim 1, wherein the potassium and/or sodium alginate is present in the form of an agglomerated powder.

8. The dry mix of claim 1, wherein both copper gluconate and ferric sulfate are present in the dry mix.

* * * * *